United States Patent [19]

Yu

[11] Patent Number: 5,319,474
[45] Date of Patent: Jun. 7, 1994

[54] OVERLAPPING DEVICE OF A COLOR VIDEO PRINTER

[75] Inventor: Chun-Keun Yu, Suwon, Rep. of Korea

[73] Assignee: SamSung Electronics Co., Ltd., Suwon, Rep. of Korea

[21] Appl. No.: 823,332

[22] Filed: Jan. 21, 1992

[30] Foreign Application Priority Data

Jan. 31, 1991 [KR] Rep. of Korea .................. 91-1875

[51] Int. Cl.⁵ .................................................. H04N 1/46
[52] U.S. Cl. ...................................... 358/515; 358/501; 358/517
[58] Field of Search .................. 358/75, 76, 78, 80, 358/98, 183, 501, 515, 517, 523, 31, 527; H04N 1/46

[56] References Cited

U.S. PATENT DOCUMENTS

| | | | |
|---|---|---|---|
| 4,727,434 | 2/1988 | Kawamura | 358/75 |
| 4,864,391 | 9/1989 | Taguchi | 358/75 |
| 4,908,701 | 3/1990 | Udagawa | 358/75 |
| 4,954,889 | 9/1990 | Endo et al. | 358/75 |
| 5,146,323 | 9/1992 | Kobori et al. | 358/75 |

Primary Examiner—Mark R. Powell
Assistant Examiner—Kim Yen Vu
Attorney, Agent, or Firm—Robert E. Bushnell

[57] ABSTRACT

A overlapping device of a color video printer for overlapping arbitrary two-field video signals on a single screen is disclosed. In this device, one field video signal between the selected two-field video signals is used with its original density and the video signal corresponding to the other field is used as a background screen by controlling the color density of the video signal by changing the digital value of the video signal by the shift register, thereby giving a perspective representation.

28 Claims, 6 Drawing Sheets

OVERLAPPING DEVICE OF A COLOR VIDEO PRINTER

BACKGROUND OF THE INVENTION

The present invention relates to an overlapping device of a color video printer, and more particularly to an overlapping device which can give a perspective representation by reducing the color density of one field screen and overlapping it as a background screen with the other field screen in arbitrary desired two-field video screen.

Generally, when a video screen is printed in a color video printer (hereinafter referred to as CVP), the received video signals include video signals corresponding to a first field and those corresponding to a second field. The first and second field video signals are input and printed through a printer or displayed through a color television monitor as one frame. Accordingly, since the color densities in the first and second fields are the same, the screen difference between fields and the perspective representation cannot be controlled.

Meanwhile, in an image processing method applied to a CVP, a recording method of a CVP is disclosed in Japanese Laid-Open Patent Publication No. Sho 61-240769. This method bas a picture-in-picture (hereinafter referred to as PIP) function for recording other information (such as character information) within a predesignated part of screen region. Another color-controlling device of a CVP is disclosed in Japanese Laid-Open Patent Publication No. Hei 1-198886, in which a video signal input from a signal input source is stored. Then, color control of the stored input video signal is performed using an output signal of a test pattern generating means.

However, the inventions disclosed in the aforementioned Japanese Laid-Open Patent Publication No. Sho 61-240769 and Hei 1-199996 do not show that the perspective representation can be given by discriminating the color densities of arbitrary two-field video signals and overlapping them on one screen.

SUMMARY OF THE INVENTION

Accordingly, it is an object of the present invention to provide an overlapping device of a CVP for overlapping desired two-field video signals on a single screen with respect to arbitrary field video signals.

It is another object of the present invention to provide an overlapping device of a CVP for controlling the density of video signals corresponding to any one field between arbitrary two-field video signals and using the density-controlled field screen as a background screen, thereby giving a perspective representation.

To achieve the above objects, the overlapping device of a color video printer according to the present invention comprises:

key input means having an overlapping mode key, a memory selecting key, and a field selecting key;

first converting means for converting an analog composite video signal received from a signal input source into digital red, green, and blue color signals;

memory means for storing by fields the digital R, G, and B signals output from the first converting means, thereby storing at least two-field video signals;

memory controlling means for outputting a timing control signal to read out arbitrary two-field video signals which have been selected from the video signals for a plurality of fields stored in the memory means by the key input means and will be overlapped;

second converting means for converting into C, M, y color signals corresponding to the arbitrary two-field digital R, G, and B signals stored in the memory means according to the timing control signal output from the memory controlling means; and thermal print head controlling means for storing line-by-line the arbitrary two-field video signals output from the second converting means, and making a thermal print bead emit beat to print.

Also, the overlapping device of a color video printer according to the present invention comprises:

key input means comprising with an overlapping mode key, a memory selecting key a field selecting key, and a color density controlling key;

first converting means for converting an analog composite video signal received from a signal input source into digital red, green, blue signals;

memory means for storing by fields the digital R, G, and B signals output from the first converting means, thereby storing at least two-field video signals;

memory controlling means for outputting a timing control signal to read out arbitrary two-field video signals which have been selected from the video signals for a plurality of fields stored in the memory means by the key inputting means and will be overlapped;

second converting means for converting into C, M, and Y signals corresponding to the arbitrary two-field digital R, G, and B signals stored in the memory means according to the timing control signal output from the memory controlling means;

color controlling means for controlling the color density by changing the digital value of the color signal output from the second converting means;

mixing means for switching by time-dividing the video signals for one field having an original color output from the second converting means and the color density-controlled video signals for the other field output from the color controlling means, and mixing them; and thermal print bead controlling means for storing line-by-line the video signals output from the mixing means, and making a thermal print bead emit heat to print.

BRIEF DESCRIPTION OF THE DRAWINGS

The above objects and other advantages of the present invention will become more apparent by describing the preferred embodiments of the present invention with reference to the attached drawings, in which.

DETAILED DESCRIPTION OF THE INVENTION

Hereinafter, a preferred embodiment of an overlapping device of a CVP according to the present invention will be described with reference to the accompanying drawings.

Figure 1:
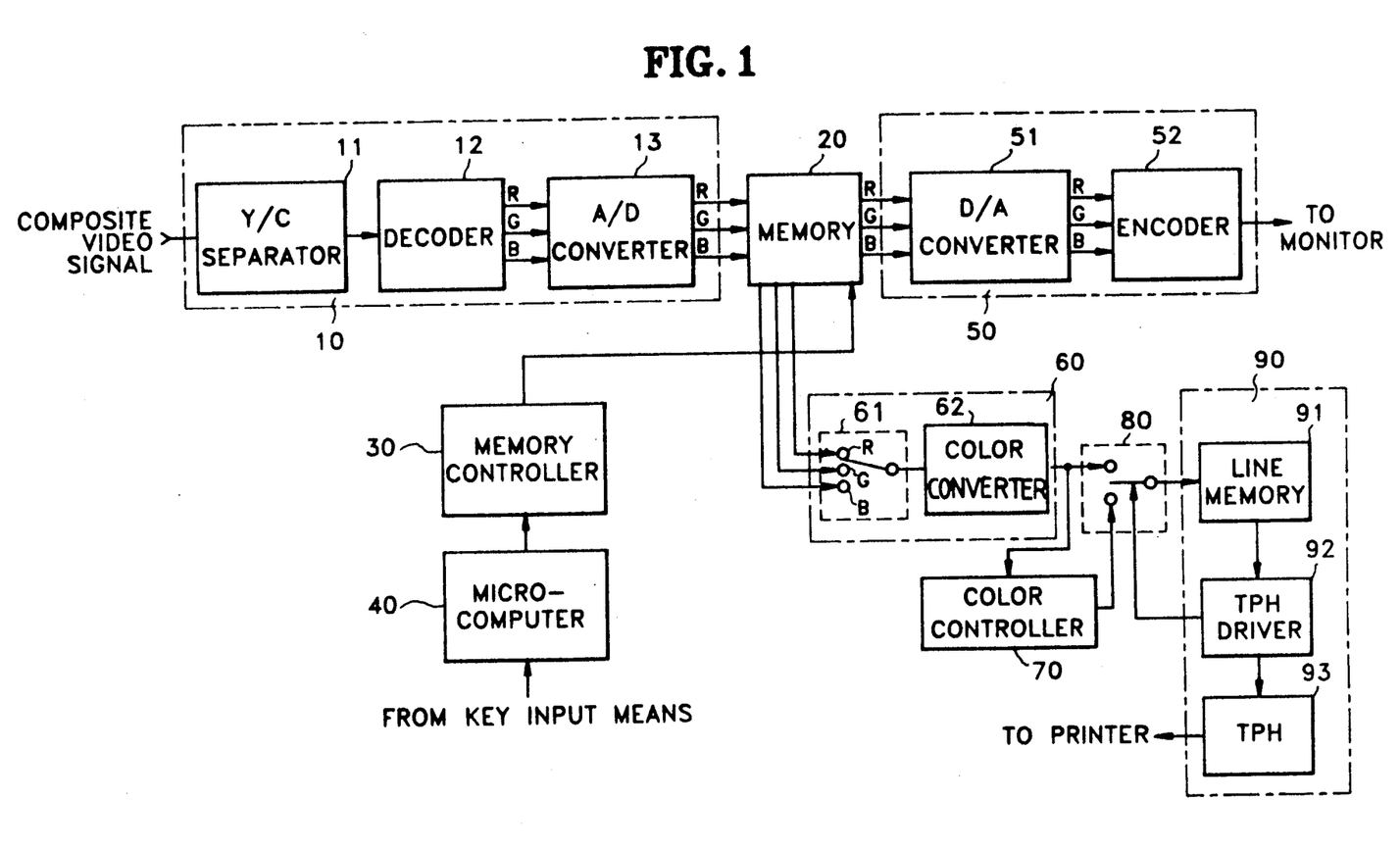
FIG. 1 is a block diagram showing an embodiment of the overlapping device of a color video printer according to the present invention.

FIG. 1 is a block diagram showing an embodiment of the overlapping device of the CVP according to the present invention.

Referring to FIG. 1, a first converter 10 comprises a Y/C separator 11 for separating a composite video signal received from a signal input source such as a television, a video tape recorder, a video camera, etc., into a luminance signal Y and a chrominance signal C, a decoder 12 for demodulating the luminance signal Y and the chrominance signal C output from the Y/C separator 11 into red (R), green (G), and blue (B) signals, and an A/D converting portion 13 consisting of first, second and third A/D converters (not individually shown) for converting analog R, G, and B signals output from decoder 12 into digital R, G, and B signals.

A memory 20 stores the digital R, G, and B signals output from A/D converting portion 13 by fields.

A memory controller 30 outputs to memory 20 a field selection control signal for selecting the arbitrary two field video signals to be overlapped, and controls the timing of the selected two fields.

A microcomputer 40 recognizes the key data input by the key input means such as the keyboard of a PC or a button provided on a CVP set, etc., and generates a control signal corresponding to the key data.

A second converting portion 50 comprises a D/A converting portion 51 composed of first, second and third D/A converters (not individually shown) for converting the digital video signals stored by fields in memory 20 into analog R, G, and B signals under the control of memory controller 30, and an encoder 52 for converting the analog R, G, and B signals output from D/A converting portion -31 into a composite video signal and outputting it to a display device (not shown) such as the monitor of a color television.

A third converting portion 60 comprises a multiplexer 61 for sequentially selecting the user selected arbitrary two-field R, G, and B signals of memory 20 by time-division, according to the timing control signal from memory controller 30 and a color converter 62 for converting the R, G, and B signals selected by multiplexer 61 into the corresponding C, M, and Y color signals, respectively.

A color controller 70 is in the form of a shift register for shifting the digital signal value of the field, which bas been output from color converter 62 and whose color density will be controlled, under the control of microcomputer 40.

A mixer 80 is composed of a control switch for switching between the signals output from color converter 62 and color controller 70.

A thermal print bead (TPH) controller 90 comprises a line memory 91 for sequentially storing line-by-line the signal switched and output by control switch 80, a TPH driver 92 composed of a processor for processing the data output from line memory 91, for controlling the switching of the control switch 80, and a TPH (a beat-emitting device) for emitting beat according to the signal output from TPH driver 92 and transferring it to an ink ribbon.

Figure 2:
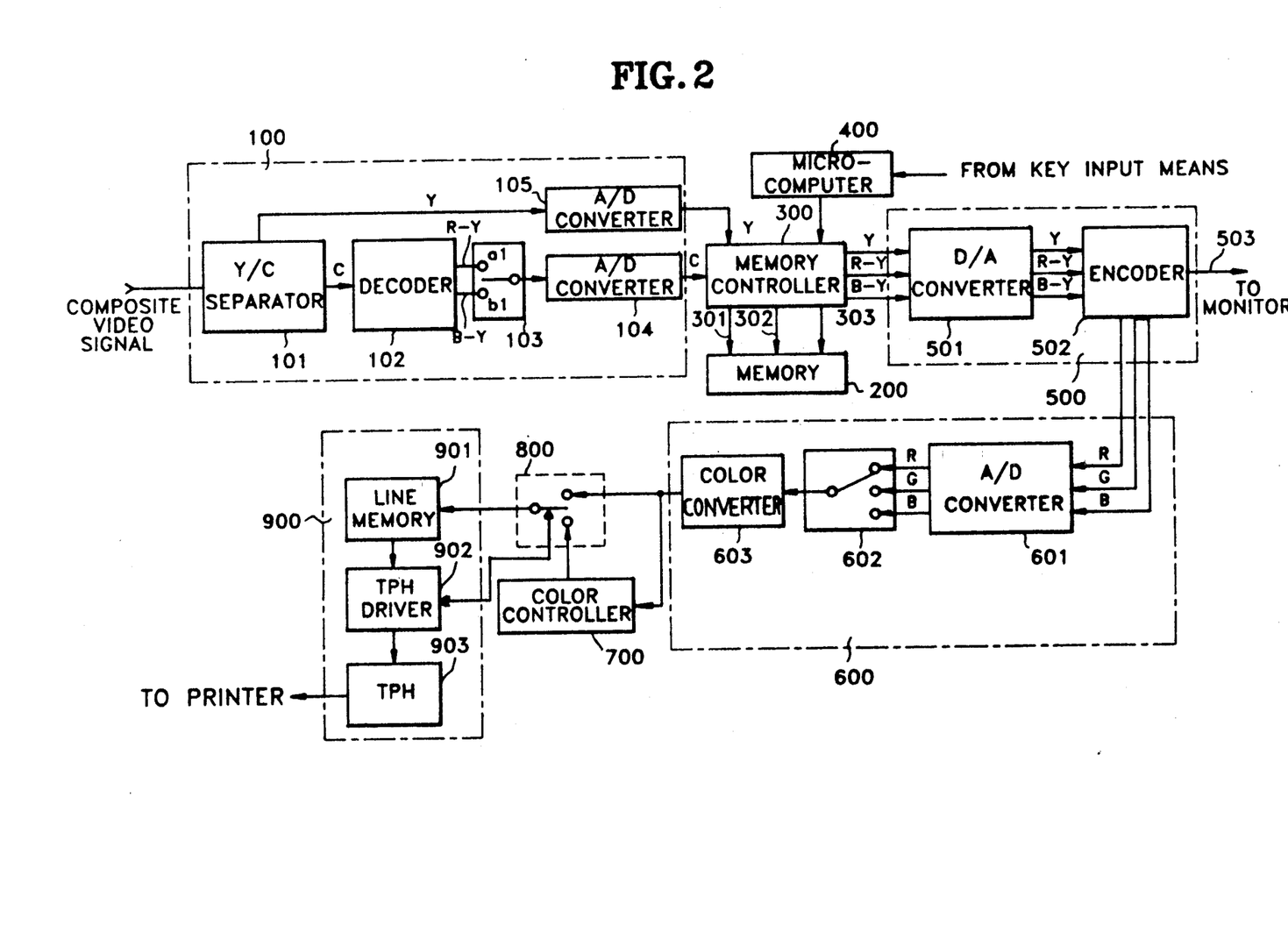
FIG. 2 is a block diagram showing another embodiment of the overlapping device of a color video printer according to the present invention.

FIG. 2 is a block diagram showing another embodiment of the overlapping device of a CVP according to the present invention.

Referring to FIG. 2, a first converting portion 100 comprises a Y/C separator 101 for separating a received composite video signal into a luminance signal Y and a chrominance signal C, a decoder 102 for separating the chrominance signal output from Y/C separator 101 into color difference signals R-Y and B-Y, a first control switch 103 for switching the color difference signals R-Y and B-Y which have been respectively supplied to selection contacts a1 and b1 from decoder 102, and outputting it as a chrominance signal C, a first A/D converter 104 for converting the analog chrominance signal C output from first control switch 103 into a digital signal, and a second A/D converter 105 for converting the luminance signal Y output from Y/C separator 101 into a digital signal.

A memory controller 300 inputs the digital chrominance and luminance signals Y and c respectively output from first and second A/D converters 104 and 105, and controls the video data to be stored field-by-field in a memory 200. A data input/output line 301, an address signal output line 302, and a write/read control signal output line 303 are connected to a memory 200. Here, memory 200 as well as a microcomputer 400 have the same constitutions as corresponding components of FIG. L.

A second converting portion 500 comprises a D/A converting portion 501 composed of first, second and third D/A converters (not individually shown) for receiving the digital luminance signal Y and the digital color difference signals R-Y and B-Y from memory controller 200 and converting them into an analog luminance signal Y and color difference signals R-Y and B-Y, and an encoder 502 for converting the luminance signal Y and color difference signals R-Y and B-Y output from D/A converting portion 501 into an analog composite video signal to display it on a display device through a first output terminal 503 or for outputting R, G, and B signals through second, third and fourth output terminals.

The constitution of a third converting portion 600 (including a multiplexer 602 and a color converter 603) is the same as the corresponding component of FIG. 1 except that a third A/D converter 601 is added to convert the R, G, and B signals output from the second, third and fourth output terminals of encoder 502 into digital signals. The constitutions of a color controller 700, a mixer 800, and a TPH controller 900 are also the same as corresponding elements of FIG. L.

Hereinafter, the operations of the overlapping device of the CVPs shown in FIGS. 1 and 2 according to the present invention will be described with reference to the operational timing diagram of FIG. 3.

Referring to FIG. 1, Y/C separator 11 separates the composite video signal received from the signal input source (television, video camera, etc.) into a luminance signal Y and a chrominance signal C and outputs them to decoder 12, which demodulates them to the R, G, and B signals.

The A/D converting portion 13 converts the analog R, G, and B signals output from decoder 12 into digital R, G, and B signals and then outputs them to memory 20 to store digital video signals corresponding to fields.

The memory 20 transmits the video signals corresponding to the field selected by the user using the key input means to D/A converter 51 and multiplexer 61 in response to the timing control signal of memory controller 30.

Meanwhile, the key input means is provided with an overlapping mode key, a field selecting key, a memory selecting key and a color density controlling key. When the user wants an overlapping of the screen, it assigns the overlapping mode key and assigns the arbitrary two fields to be overlapped by the field selection key and the memory selecting key, and assigns the color density controlling key to control the color for any one field between tho selected two fields.

The microcomputer 40 recognizes the key assigned by the key input means and outputs a control signal for controlling of the memory controller 30 to read out the selected arbitrary two field among the data in fields stored in memory 20.

Here, the first field video signals selected by the key input means are for an original screen whose density is not reduced and the selected second field video signals are for a background screen having reduced density. When overlapping the above two screens, the first and second field video signals output from memory 20 are converted into analog signals in D/A converting portion 51 to be input to encoder 52. Encoder 52 displays them as a composite video signal through a display device such as a monitor.

Meanwhile, multiplexer 61 sequentially selects the selected R.G and B field signals output from memory 20, and outputs them to color converter 62, where they are converted into C, M, and Y color signals. These are the complementary colors of the R, G, and B signals output from multiplexer 61. Here, color converter 62 converts them into complementary colors, and if any two colors are mixed, they become white. Specifically, a red (R) signal becomes a cyan (C) signal, a green (G) signal becomes a magenta (M) signal, and a blue (B) signal becomes a yellow (Y) signal.

Under the control of TPH driver 92, control switch 80 selects one field of data having an original color density output from color converter 62 and the other field of data having a controlled color density from color controller 70, and supplies them to line memory 91.

Meanwhile, the data input to line memory 91 is represented by 64 gradations. Here, when the image information such as a face photograph is processed by 8-bit data, it is represented by the gradation number of 256 steps. At this time, a shade variation can be obtained which almost equals the original picture. If image information such as a photograph of a face or the like, is represented by less than 16 gradations, a separation line between light and dark appears markedly, and is not evident under representation by 256 gradations. These light and dark separation lines are called "false contours" and deteriorates picture quality. Accordingly, representation with 64 or more gradations which at least does not show the false contours, is preferably needed to represent detailed shading such as would be represent in a facial photograph.

Accordingly, in the present invention, the image signal is represented by 64 gradations, and if the 64 gradations are assumed as having a density of 100%, then 500% corresponds to 32 gradations and 25% is 16 gradations, with 0% being 0 gradations.

That is, when serial data for each pixel is output from color converter 62 and used as a 6-bit which can represent 64 gradations, the data representing 100% Y is input to line memory 91 as a serial data of "111111", and the data of 50% Y is input as a data of "011111". The 25% and 0% Y data are input to line memory 91 as "001111" and "000111", respectively. When this one input line of a horizontal line of the screen ends, serial data of the next line is sequentially input to line memory 91 pixel-by-pixel.

When the one field densities of the previously selected first field (here, the first field) are input as 100% Y, 50% Y, 25% Y and 0% Y, in the case of 100% Y, the data "111111" is shifted to a desired density by a right shift register in color controller 70 under the control of microcomputer 40, so that the second field (here, the nth field) data used as a background screen (which can be arbitrarily selected by the user using the key input means) is input as "011111" from "111111", i.e. data value 31 changed from data value 63.

If a signal having a data value of 63 in 64-gradation processing as 100% is halved to a data value of 31, it means that the density becomes 50%. If the signal is shifted once again in color controller 70, it is halved to the data "001111", i.e., a data value of 15, thereby having 25% density. Using the above-mentioned sequential method, the density of the input video signal can be controlled as the density of the background screen, for example ½ or ¼ density.

Figure 3A:
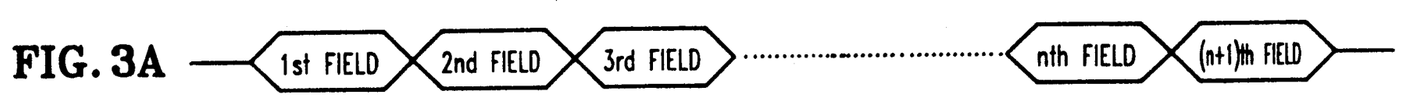
FIGS. 3A to 3E are an operational timing diagrams of the signals output from the overlapping device of the color video printer shown in FIGS. 1 and 2.

The data output from color converter 62 is output in fields as shown in FIG. 3A. The field data is output by fields and stored line-by-line in line memory 91.

Figure 3B:
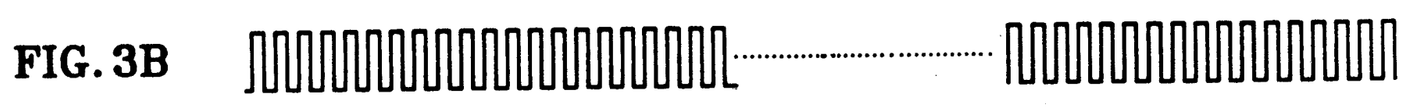
Figure 3C:
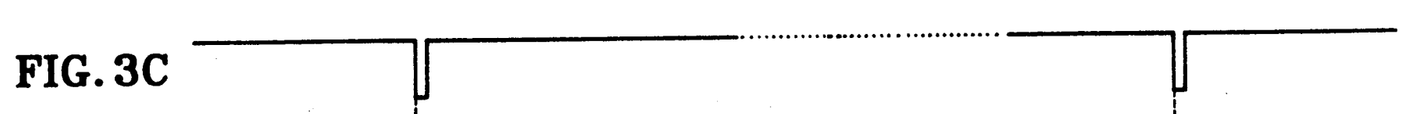
Figure 3D:
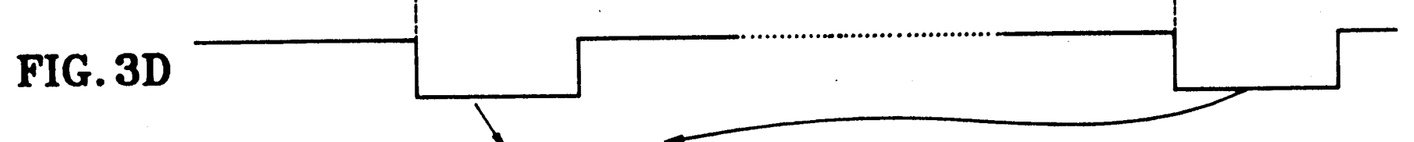
Figure 3E:
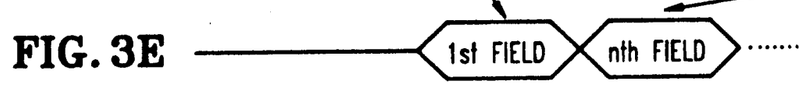

The TPH driver 92 outputs a strobe "low" signal as shown in FIG. 3D at the falling edge of the latch signal shown in FIG. 3C in response to the clock signal shown in FIG. 3B. Since the video signals to be overlapped (here, the first field and the nth field) are stored in the line memory 91 during the "low" interval of the strobe signal, TPH driver 92 converts the data stored in line memory 91 into a current signal during the "low" interval of the strobe signal (FIG. 3D) as shown in FIG. 3E, so that the TPH 93 emits heat to transfer it to the ink ribbon.

At this time, the dyes provided in the ink ribbon sequentially painted with separated Y, M, and C three-color inks are sublimed to be provided in the record paper, so that the overlapped video information is printed.

Meanwhile, if a shift register is installed at the input of D/A converting portion 51, the density of the background screen can be controlled after being viewed on a monitor.

FIG. 2 is a block diagram showing a constitution of another embodiment of an overlapping device of a CVP according to the present invention.

Referring to FIG. 2, Y/C separator 101 of first converting portion 100 separates a received analog video signal into a luminance signal Y and a chrominance signal C. Then, decoder 102 demodulates the separated chrominance signal C into color difference signals R-Y and B-Y.

The first A/D converter 104 switches the color difference signals R-Y and B-Y output from decoder 102 by control switch 103 and converts it into a digital signal to output it to memory controller 300.

The second A/D converter 105 converts the luminance signal Y output from Y/C separator 101 into a digital signal and outputs it to memory controller 300.

The memory controller 300 stores the digital luminance signal Y and color difference signals R-Y and B-Y in the address of memory 200 assigned according to the write control signal under the control of a microcomputer 400.

Meanwhile, microcomputer 400 recognizes the key data input by the key input means, which include a key for setting an overlapping mode, a field selecting key for selecting a screen of the field to be overlapped according to the set overlapping mode, a memory selecting key, and a color density controlling key for controlling the color of any one field from the selected fields. Then, microcomputer 400 generates control signals corresponding to the respective keys and outputs them to memory controller 300.

Under the control of microcomputer 400, memory controller 300 reads out the video data from memory 200 which corresponds to the arbitrary field selected by the user, then outputs them to D/A converting portion 501.

The D/A converting portion 501 converts the digital luminance signal Y and color difference signals R-Y and B-Y output from memory controller 300 into analog signals.

The encoder 502 modulates the output signal of D/A converting portion 501 into a composite video signal to display it on a color television monitor, or outputs the analog R, G, and B signals to third converting portion 600.

The third A/D converter 601 converts the analog R, G, and B signals output from encoder 502 into digital R, G, and B signals.

The multiplexer 602 sequentially selects the R, G, and B signals from third A/D converter 601 by time-division and in response to the timing control signal for controlling the read out of the arbitrary two-field video signals stored in memory 200 output from memory controller 300.

The color converter 603 converts the R signal selected by multiplexer 602 into a C signal, and likewise the G signal into a M signal and the B signal into a Y signal.

Under the control of microcomputer 400, color controller 700 shifts to the right the C, M, and Y data of the field which will be used as a background screen, thereby halving the data value to reduce the density output from color converter 600.

A processor (not shown) of TPH driver 902 controls second control switch 800 to select a video signal of the original density field (here, the first field) and the video signal of the density-controlled field (here, the nth field) output from color controller 700 as shown in FIG. 3E, and stores them in line memory 901. The signal stored in line memory 901 is converted into a current signal having video information, and making a TPH 903 emit heat and thereafter printed.

Figure 4A:
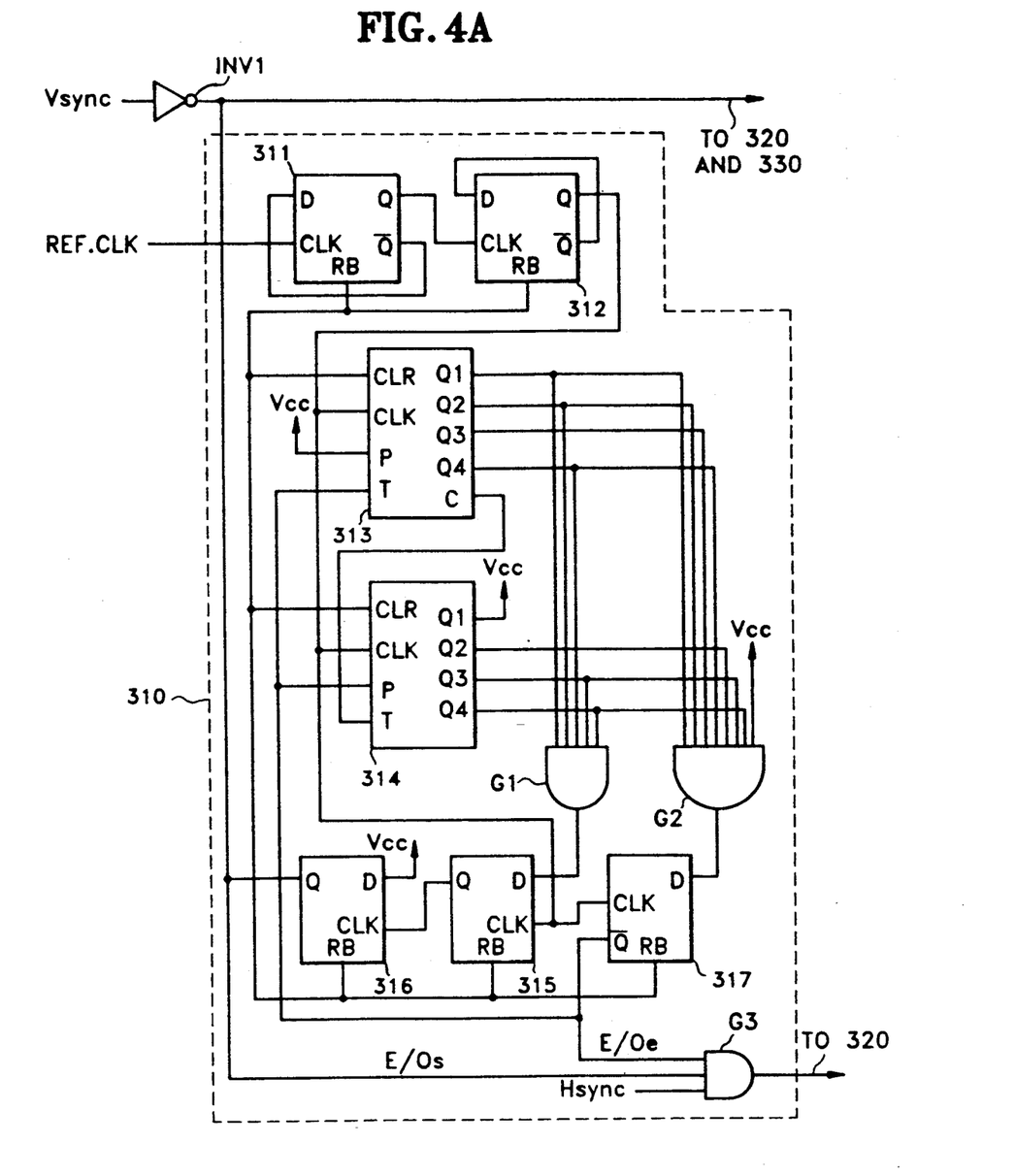
FIGS. 4A and 4B are detailed circuit diagrams for an E/O discrimination and field selection of a memory controller used in the device shown in FIGS. 1 and 2.
Figure 4B:
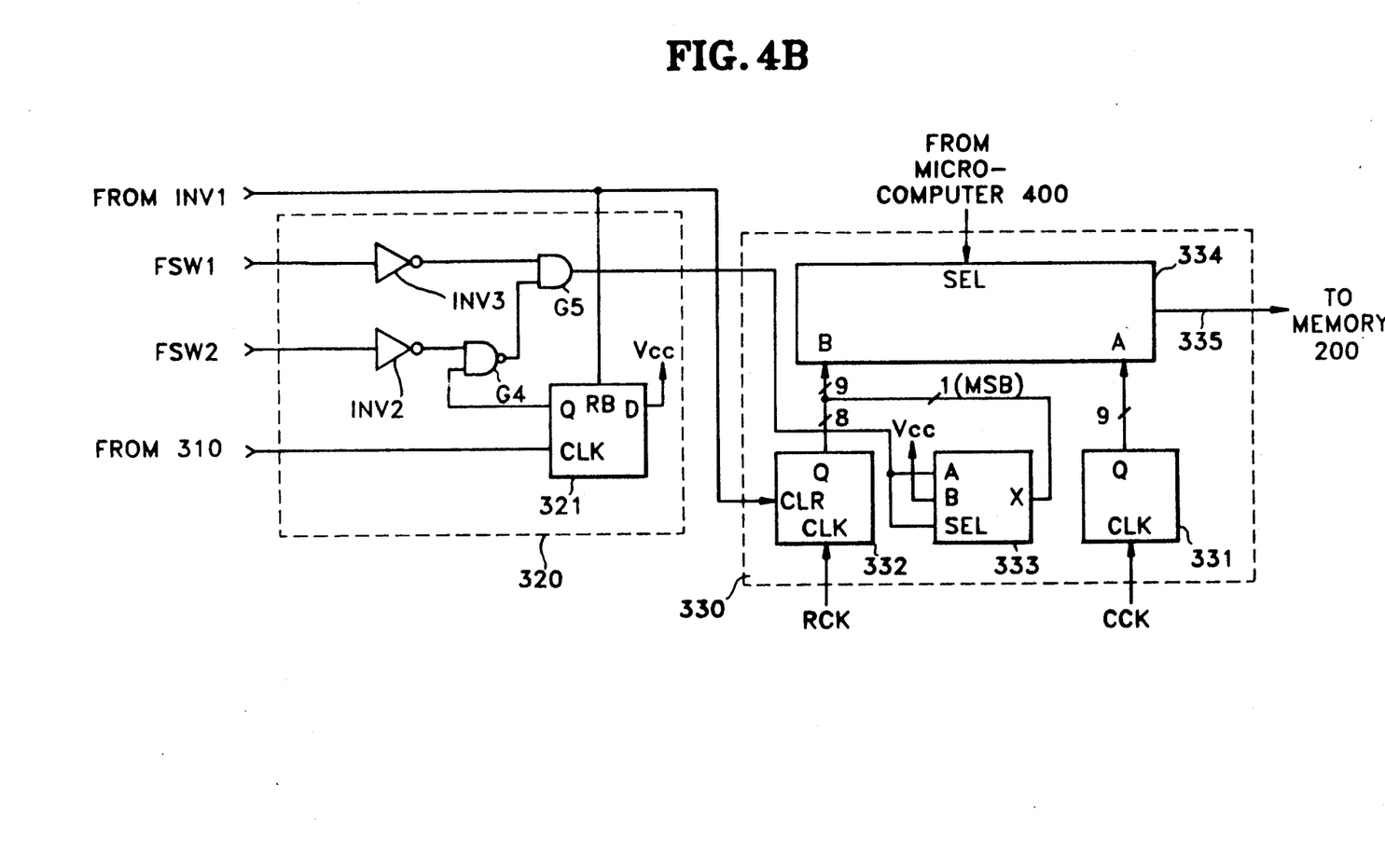

FIGS. 4A and 4B are detailed circuit diagrams for the even/odd discrimination and field selection of the memory controller used in the device shown in FIGS. 1 and 2.

Referring to FIGS. 4A and 4B, a clock terminal CLK of a first D flip-flop 311 (hereinafter referred to as Df/f) of the memory controller 300 shown in FIG. 2 is connected to an output terminal of a clock generator (not shown) for generating a clock having a frequency 3 fsc which is three times as large as a chrominance subcarrier, its input terminal D is connected to an inverting output terminal $\overline{Q}$, while its output terminal Q is connected to a clock terminal CLK of a second Df/f 312. An input terminal D of the second Df/f 312 is connected to an inverting output terminal $\overline{Q}$, while its output terminal Q is connected to clock terminals CLK of first and second counters 313 and 314 as well as clock terminals CLK of third and fifth Df/f 315 and 317.

First, second, and fourth output terminals Q1, Q2, and Q4 of the first counter 313 are connected to first to third input terminals of a first AND gate G1, respectively, and its counter enable terminal P and carrier output terminal C are connected to a power supply terminal and a counter enable terminal T of the second counter 314, respectively.

Third and fourth output terminals Q3 and Q4 of the second counter 314 are connected to fourth and fifth input terminals of the first AND gate G1. First to fourth input terminals of a second AND gate G2 are connected to the first to fourth output terminals Q1 to Q4 of the first counter 313, its fifth to seventh input terminals are connected to the second to fourth output terminals Q2 to Q4 of the second counter 314, its eighth input terminal is connected to a power supply terminal, and its output terminal is connected to an input terminal D of the fifth Df/f 317.

An inverting output terminal $\overline{Q}$ of the fifth Df/f 317 is connected to a counter enable terminal T of the first counter 313, a counter enable terminal P of the second counter 314, and a third input terminal of a first AND gate G3, respectively.

An input terminal D of the third Df/f 315 is connected to an output terminal of the first AND gate G1, and its output terminal Q is connected to a clock terminal CLK of a fourth Df/f 316.

Input terminal D and output terminal Q of the fourth Df/f 316 are connected to a power supply terminal and a second input terminal of the third AND gate G3, respectively.

A third input terminal of the third AND gate G3 is connected to a horizontal synchronizing signal output terminal of a synchronizing signal separator (not shown) and its output terminal is connected to a clock terminal CLK of a sixth Df/f 321. An input terminal D of the sixth Df/f 321 is connected to a power supply terminal, its output terminal is connected to a second input terminal of a NAND gate G4, and its clear terminal RB is connected to a vertical synchronizing signal output terminal of the synchronizing signal separator through a first inverter INV1. The vertical synchronizing signal output terminal is connected to the clear terminals RB of the first to fifth Df/f 311, 312, 315, 316, and 317 and the clear terminals CLR of the first to fourth counters 313, 314, 331, and 332.

Here, the first to fifth Df/f 311, 312, 315, 316, and 317, the first and second counters 313 and 314, and the first to third AND gates G1 to G3 constitute an even/odd (E/O) discriminator 310.

A first input terminal of the NAND gate G4 is connected to a terminal for outputting a control signal for a second field selecting key of the microcomputer 400 through a second inverter INV2, and its output terminal is connected to a second input terminal of a fourth AND gate G5. A first input terminal of the fourth AND gate G5 is connected to a terminal for outputting a control signal for a first field selecting key of the microcomputer 400 through a third inverter INV3, and its output terminal is connected to a selection terminal SEL and a first input terminal A of a first multiplexer 333.

Here, the sixth Df/f 321, the NAND gate G4, the fourth AND gate G5, and the second and third inverters INV2 and INV3 constitute a field selector 320.

A clock terminal CLK of a third counter 331 is connected to an output terminal of a column clock generator (not shown) and its output terminal is connected to a first input terminal A of a second multiplexer 334. A clock terminal CLK of a fourth counter 332 is connected to an output terminal of a row clock generator (not shown), and its output is connected to a second input terminal B of the second multiplexer 334. A second input terminal B of the first multiplexer 333 is connected to a power supply terminal, and its output terminal is connected to the second input terminal B of the second multiplexer 334.

An output terminal 335 of the second multiplexer 334 is connected to an address terminal of the memory 200.

A selection terminal SEL of the second multiplexer 334 is connected to a selection control signal output terminal of the microcomputer 400.

Hereinafter, the operations of the circuits shown in FIGS. 4A and 4B will be described with reference to the waveform diagrams of FIGS. 5 and 6.

Referring to FIGS. 4A and 4B, the clock signal 3 fsc, which is a reference clock signal three times the chrominance subcarrier frequency, is input to the clock terminal of the first Df/f 311 of the E/O discriminator 310. The halved frequency of the reference clock is input to the clock terminal of the second Df/f 312.

The second Df/f 312 again halves the frequency of the output value of the first Df/f 311 and outputs it as clock signals of the first and second counters 313 and 314 and clock signals of third and fifth Df/f 315 and 317.

The first counter 313 outputs frequency divided signals which are reference clock signal divided by 8, 16, 32 and 64, from the first to fourth output terminals Q1 to Q4 by an internal flip-flop (not shown), wherein their values correspond to the binary values of $2^3$, $2^4$, $2^5$, and $2^6$. When these values output from the first to fourth output terminals Q1 to Q4 of the first counter 313 are all "1's", a logic "high" signal output from its carry output terminal C input to the count enable terminal T of the second counter 314, so that the second counter 314 starts counting.

The reference clock signals divided by 256, 512, and 1028 are output from the second to fourth output terminals Q2 to Q4 of the second counter 314, respectively where their values correspond to the binary values of $2^8$, $2^9$, and $2^{10}$. If the first AND gate G1 AND-gates the first, second, and fourth output signals $2^3$, $2^4$, and $2^6$ of the first counter 313 as well as the third and fourth output signals $2^9$ and $2^{10}$ of the second counter 314, and if this output is a decimal number 1627, i.e., the counted value in the first and second counters 313 and 314, a logic high signal is input to the input terminal D of the third Df/f 315. The output of the third Df/f 315 is supplied to the clock terminal of the fourth Df/f 316. At this time, the third Df/f 315 serves as a latch for maintaining a secured output value of the first AND gate G1.

The value output from the output terminal Q of the fourth Df/f 316 is input to the second input terminal of the third AND gate G3.

Meanwhile, when the AND-gated value of the first to fourth output signals $2^3$, $2^4$, $2^5$, and $2^6$ of the first counter 313 and the second to fourth output signals $2^8$, $2^9$, and $2^{10}$ of the second counter 314, becomes a decimal number 1907, i.e., the value counted in the first and second counters 313 and 314, the second AND gate G2 outputs a logic high signal and supplies it to the input terminal D of the fifth Df/f 317. The fifth Df/f 317 inverts the output signal of the second AND gate G2 and inputs it to the first input terminal of the third AND gate G3.

After the vertical synchronizing signal of vertical blanking interval is generated, the horizontal synchronizing signal Hsync input to the third input terminal of the third AND gate G3 is generated having different equalizing pulse intervals in the even and odd fields.

Figure 5A:
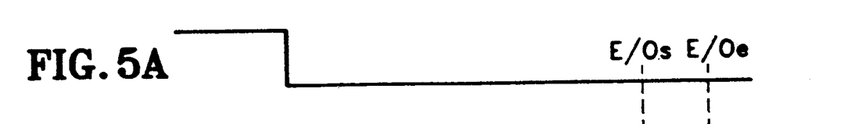
FIGS. 5A to 5C are timing diagrams for explaining the field discrimination.
Figure 5B:
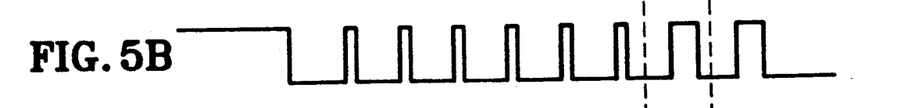
Figure 5C:
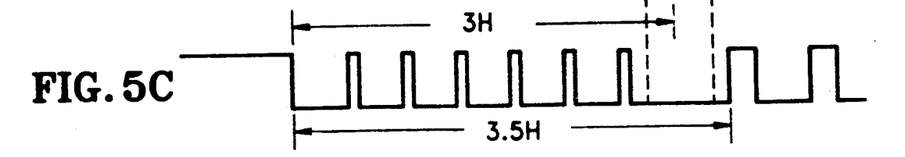

That is, after the vertical synchronizing signal is generated as shown in FIG. 5A, during a blanking interval, in an odd field, a horizontal synchronizing signal is generated after the equalizing pulse interval is 3H as shown in FIG. 5B. In an even field, a horizontal synchronizing signal is generated after the equalizing pulse interval is 3.5H as shown in FIG. 5C. The output value of the 4Df/f 315 input to the second input terminal of the third AND gate G3 becomes an even/odd field discrimination starting point (hereinafter referred to as E/Os). The output value of the fifth Df/f 317 input to the third input terminal of the third AND gate G3 becomes an even/odd field discrimination ending point (hereinafter referred to as E/Oe).

At this time, the number of pixels in one horizontal line becomes a ratio of the time for generating a reference clock per a horizontal period, $$\frac{1H(\text{time})}{T} = \frac{63.5\ \mu s}{\frac{1}{3fsc}} \approx 591$$

Accordingly, since the horizontal synchronizing signal Hsync in an odd field is generated between 2.5H and 3.5H times, the E/Os and E/Oe are set properly in this interval. That is, the output value of the AND gate G3 is a logic high in an odd field and a logic low in an even field. These output values are supplied to the second input terminal of the NAND gate G4 through the sixth Df/f 321.

Figure 6A:
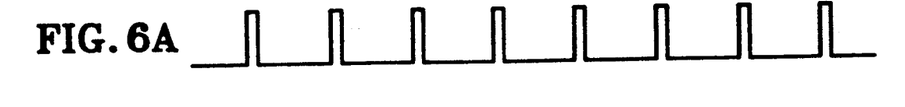
FIGS. 6A to 6E are an operational waveform diagrams for the memory controller shown in FIG. 4.

Meanwhile, as shown in FIG. 6A, the vertical synchronizing signal Vsync clears the first to sixth Df/f 311, 312, 315, 316, 317, and 321, and the first to second counters 313, 314, 331, and 332 every vertical synchronizing signal period.

The NAND gate G4 receives a control signal for the second field selecting key of the key input means through the inverter INV2 and the output signal of the sixth Df/f 321, and outputs the result to the second input terminal of the fourth AND gate G5.

The fourth AND gate G5 outputs the AND-gated value of the control signal for the first field selecting key of the key input means and the output signal of the NAND gate G4 to the first input terminal A and selection terminal SEL of the first multiplexer 333.

A table for the first field selection control signal FSW1, the second field selection control signal FSW2, and the output signal FS of the fourth AND gate G5 is shown in TABLE 1.

TABLE 1

| FSW1 | FSW2 | FS |
|------|------|-----|
| 0 | 0 | repeating 0 and 1 |
| 1 | 0 | 0 |
| 0 | 1 | 1 |

Figure 6B:
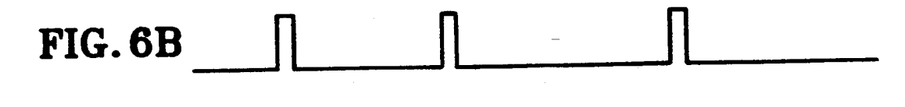
Figure 6C:
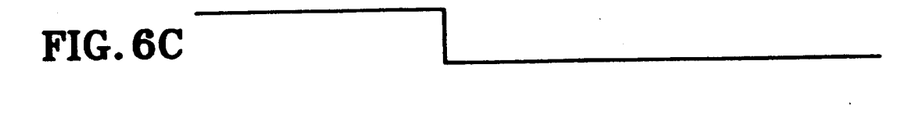
Figure 6D:
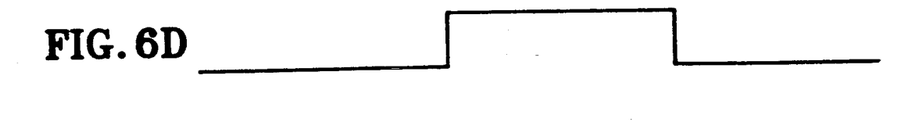

That is, if the user sets the memory selecting key provided in the key input means, the microcomputer 400 recognizes it as a signal shown in FIG. 6B. After the memory selecting key is selected, if a first field selecting key is assigned, a "low" signal is recognized as shown in FIG. 6C. Similarly, after the memory selecting key is selected, if the second field selecting key is assigned, a "high" signal is recognized as shown in FIG. 6D.

The output signal FS of the fourth AND gate G5 becomes a control signal for controlling the mixer 800 in the TPH driver 902 shown in FIG. 2.

Figure 6E:
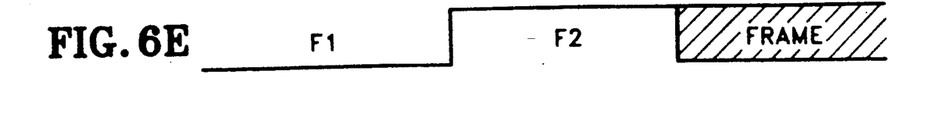

Accordingly, if the first field selecting key is assigned, the signal output from the fourth AND gate G5 becomes a logic low signal regardless of the output signal of third AND gate G3 of the E/O discriminator 310 as shown in FIG. 6E. If the second field selecting key is assigned, the output of fourth AND gate G5 becomes a logic high signal regardless of the output signal of the third AND gate G3 of the E/O discriminator 310, and if the first and second field selecting keys are not assigned, a logic low signal and a logic high signal are repeatedly output.

Meanwhile, the third counter 331 of the address generator 330 receives a reference row clock, counts it as a decimal number from 0 to 511, and supplies it to first input terminal A of the second multiplexer 334.

If the signal output from the fourth AND gate G5 is output as a logic low signal, i.e., a control signal for selecting the first field, a one-bit output signal of the first multiplexer 333 becomes the most significant bit of a column address and the output signal of the first multiplexer 333 becomes a logic "0". At this time, the fourth counter 332 counts the column addresses from 0 to 255 corresponding to a first field and is then cleared. Thereafter, fourth counter 332 supplies that counted value to the second input terminal B of the second multiplexer 334.

If the signal output from the fourth AND gate G5 is output as a logic high signal, i.e., a control signal for selecting a second field, the output signal of the first multiplexer 333 becomes a logic "1" and the fourth counter 332 counts the column addresses from 256 to 511 corresponding to the second field and supplies the counted value to the second input terminal B of the second multiplexer 334. The second multiplexer 334 selects a column address or a row address and outputs it to the address terminal of the memory 200.

As described above, according to the present invention, the overlapping device of a CVP has the effect of overlapping an arbitrary field video signal desired by the user which is not the video signal of the field just input from the first field video signal to be overlapped.

Also, in the present invention, the density of the digital video signal corresponding to any one of two fields to be overlapped is reduced to be processed with a lower density than that of the original screen, thereby having the effect of clearly sensing the discrimination of the overlapped fields.

What is claimed is:

1. An overlapping device of a color video printer, comprising:
   means for receiving a video signal;
   first converting means for converting the video signal into red, green, and blue color signals;
   memory means for storing a plurality of fields representative of the red, green and blue color signals;
   memory controlling means for controlling selection of an arbitrary reproduction of two-field video signals from the plurality of fields stored in said memory means, and for controlling an overlap of said two-field video signals at a proper timing;
   second converting means for converting the arbitrary two-field video signals into cyan, magenta, and yellow color signals under control of said memory controlling means; and
   thermal print head controlling means for storing the cyan, magenta and yellow color signals representative of the arbitrary two-field video signals, and for printing the stored cyan, magenta and yellow color signals.

2. The overlapping device of a color video printer as claimed in claim 1, further comprising system controlling means responsive to a keyboard, for controlling said memory controlling means by selecting the two fields to be overlapped, and controlling color density of one of the selected two fields.

3. The overlapping device of a color video printer as claimed in claim 1, wherein said memory controlling means comprises:
   E/O discriminator means for discriminating an odd field from an even field according to detection of a first horizontal synchronizing signal within a predetermined interval;
   field selector means for outputting a field selection control signal according to a field assigned by a user in an overlapping mode; and
   address generator means for supplying an address signal corresponding to one of a main screen field and a subscreen field selected according to the field selection control signal to the memory means.

4. An overlapping device of a color video printer as claimed in claim 1, wherein said second converting means comprises:
   multiplexer means for enabling selective transmission of one of the red, green and blue color signals of the arbitrary two-field video signals in dependence upon a timing control signal of said memory controlling means to provide multiplexed color signals; and
   color converter means for converting the multiplexed color signals into corresponding complementary color signals.

5. The overlapping device of a color video printer as claimed in claim 1, further comprising third converting means for converting the red, green and blue color signals corresponding to the arbitrary two fields into analog signals, and for modulating the analog signals into a composite video signal for display on a display device.

6. An overlapping device of a color video printer, comprising:
   means for receiving a composite video signal;
   first converting means for converting said composite video signal into red, green, and blue color signals;
   memory means for storing the red, green and blue color signals on a field-by-field basis;
   memory controlling means for controlling selection of arbitrary reproduction of two-field video signals from the fields stored in said memory means, and for controlling an overlap of said two-field video signals;
   second converting means for converting the arbitrary two-field video signals stored in said memory means into cyan, magenta, and yellow color signals of a first field in dependence upon a timing control signal output from said memory controlling means;
   color controlling means for controlling color density of the cyan, magenta, and yellow color signals of a second field;
   mixing means for mixing the cyan, magenta and yellow color signals of the first field from said second converting means and the cyan, magenta and yellow color signals of the second field from said color controlling means; and thermal print head controlling means for storing and printing the output of said mixing means on a line-by-line basis.

7. The overlapping device of a color video printer as claimed in claim 6, further comprising system controlling means responsive to a keyboard, for controlling said memory controlling means by selecting the desired two fields which will be overlapped, and for controlling the color density for one of the selected two fields via said color controlling means.

8. The overlapping device of a color video printer as claimed in claim 6, wherein said memory controlling means comprises:

E/O discriminator means for discriminating an odd field from an even field according to detection of a first horizontal synchronizing signal within a predetermined interval;

field selector means for outputting a field selection control signal according to the field assigned by a user in an overlapping mode; and address generator means for supplying an address signal corresponding to one of a main screen field and a subscreen field selected according to the field selection control signal to the memory means.

9. The overlapping device of a color video printer as claimed in claim 6, wherein said second converting means comprises:

multiplexer means for enabling selective transmission of one of the red, green and blue color signals of the arbitrary fields read out from said memory means in dependence upon the timing control signal to provide multiplexed color signals; and color converter means for converting the multiplexed color signals into corresponding complementary color signals.

10. The overlapping device of a color video printer as claimed in claim 9, wherein said color controlling means is a shift register for controlling the color density by shifting digital values of said color converting means.

11. The overlapping device of a color video printer as claimed in claim 10, wherein said mixing means comprises a control switch for switching between the field video signal having an original color output from said color converting means and the field video signal having the color density controlled output from said color controlling means.

12. The overlapping device of a color video printer as claimed in claim 6, further comprising third converting means for converting the red, green and blue color signals corresponding to the arbitrary two fields into analog signals, and for modulating the analog signals into a composite video signal for display on a display device.

13. The overlapping device of a color video printer as claimed in claim 11, wherein said third converting means comprises a shift register for controlling the color density by shifting the digital values of the red, green and blue color signals of any one field of the arbitrary two fields output from said memory means, thereby enabling an overlap of an color density-controlled screen and an original screen on a display device.

14. An overlapping device of a color video printer, comprising:

first converting means for demodulating a composite video signal into a luminance signal and a chrominance signal;

memory means for storing the luminance and chrominance signals on a field-by-field basis;

memory controlling means for controlling an arbitrary selection of two fields from a plurality of fields stored in said memory means, and for controlling an overlap of the two selected fields in dependence upon a timing controlling signal;

second converting means for modulating the luminance signal and the chrominance signal of the two arbitrary fields read out by said memory controlling means into the composite video signal for display on a display device, and for converting the luminance signal and the chrominance signal into red, green and blue color signals;

third converting means for converting the red, green and blue color signals into corresponding complementary color signals;

thermal print head controlling means for storing and printing the complementary color signals of the two selected fields.

15. An overlapping device of a color video printer, comprising:

first converting means for converting a composite video signal into a luminance signal and a chrominance signal;

memory means for storing the luminance and chrominance signals on a field-by-field basis;

memory controlling means for controlling an arbitrary selection of two fields from a plurality of fields stored in said memory means, and for controlling an overlap of the two selected fields in dependence upon a timing control signal;

second converting means for modulating the luminance signal and the chrominance signal of the two arbitrary fields into the composite video signal for display on a display device, and for converting the luminance signal and the chrominance signal of the two arbitrary fields into red, green and blue color signals;

third converting means for converting the red, green and blue signals into corresponding complementary color signals of the two arbitrary fields;

color controlling means for controlling a color density of one field of the complementary color signals to provide density-controlled complementary color signals;

mixing means for mixing the complementary color signals and the density-controlled complementary color signals to provide mixed complementary color signals; and thermal print head controlling means for storing and printing the mixing complementary color signals on a line-by-line basis.

16. The overlapping device of a color video printer as claimed in claim 14, wherein said memory controlling means comprises:

E/O discriminator means for discriminating an odd field from an even field in dependence upon a synchronizing signal;

field selector means for outputting a field selection control signal according to a field assigned by a user in an overlapping mode; and address generator means for supplying an address signal corresponding to one of a main screen field and a subscreen field selected according to the field selection control signal to the memory means.

17. The overlapping device of a color video printer as claimed in claim 14, wherein said third converting means comprises:
   multiplexer means for multiplexing the red, green and blue color signals of the two arbitrary fields to provide multiplexed color signals; and
   color converter means for converting the multiplexed color signals into the corresponding complementary color signals.

18. The overlapping device of a color video printer as claimed in claim 15, wherein said memory controlling comprises:
   E/O discriminator means for discriminating an odd field from an even field in dependence upon a synchronizing signal;
   field selector means for outputting a field selection control signal according to a field assigned by a user in an overlapping mode; and
   address generator means for supplying an address signal corresponding to one of a main screen field and a subscreen field selected according to the field selection control signal to the memory means.

19. The overlapping device of a color video printer as claimed in claim 15, wherein said third converting means comprises:
   multiplexer means for multiplexing the red, green and blue color signals of the two arbitrary fields to provide multiplexed color signals; and
   color converter means for converting the multiplexed color signals into the corresponding complementary color signals.

20. The overlapping device of a color video printer as claimed in claim 15, wherein said thermal print head controlling means comprises:
   line memory means for storing the mixed complementary color signals on a line-by-line basis;
   driver means for driving the stored color signals; and
   thermal printhead means for radiating thermal heat in accordance with color component electrical signals representing a color image to be printed on a printable medium.

21. An overlapping device for a color video printer, comprising:
   means for receiving a composite video signal;
   means for separating a plurality of color components from said composite video signal;
   memory means for storing the plurality of color components of said composite video signal on a field-by-field basis;
   controller means for controlling an arbitrary selection of any two fields of said composite video signal; and
   means for converting the plurality of color components of said two fields into complementary color components, and controlling pixel density of one of said two fields to provide a frame data comprised of first field data having said complementary color components of said composite video signal and second field data having the controlled pixel density.

22. The overlapping device for a color video printer as claimed in claim 21, further comprised of thermal printhead controller means comprising:
   line memory means for storing said frame data comprised of said first and second field data on a line-by-line basis; and
   driver means for driving the stored frame data to enable a thermal printhead to print said stored frame data on a line-by-line basis.

23. The overlapping device for a color video printer as claimed in claim 21, further comprised of display means for enabling a visual display of the composite video signal having said frame data.

24. The overlapping device for a color video printer as claimed in claim 21, wherein said plurality of color components of said composite video signal respectively represent red, green and blue color components, and said complementary color components represent cyan, magenta and yellow color components.

25. A method for overlapping two arbitrary fields of a composite video signal for a color video printer, comprising the steps of:
   receiving a composite video signal;
   storing said composite video signal on a field-by-field basis in a memory;
   arbitrarily selecting any two fields of said composite video signal stored in said memory;
   controlling pixel density of a first one of said two fields, and overlapping the two fields together to provide frame data;
   enabling a printing of said frame data in dependence upon reception of said frame data on a line-by-line basis.

26. The method for overlapping two arbitrary fields of a composite video signal for a color video printer as claimed in claim 25, further comprised the step of enabling a visual display of said frame data on one of a television screen and a monitor.

27. The method for overlapping two arbitrary fields of a composite video signal for a color video printer as claimed in claim 26, wherein said first one of said two fields of said frame data having controlled pixel density is used as a background screen.

28. An overlapping device for a color video printer, comprising:
   means for receiving composite video signals;
   memory means for storing said composite video signals on a field-by-field basis;
   controller means for controlling an arbitrary selection of any two fields of said composite video signals;
   means for controlling pixel density of one of the two fields of said composite video signals selected by said controller means and overlapping the two fields together into frame data; and
   means for storing said frame data on a line-by-line basis and for enabling a thermal print head to print said frame data.

* * * * *

UNITED STATES PATENT AND TRADEMARK OFFICE
CERTIFICATE OF CORRECTION

PATENT NO. : 5,319,474

DATED : June 7, 1994

INVENTOR(S) : Chun-Keun Yu

It is certified that error appears in the above-indentified patent and that said Letters Patent is hereby corrected as shown below:

Column 1

Lline 39,     change "1-199996" to --1-198886--;

Column 2

Line 3,     change "y" to --Y--;

Line 12,     change "beat" to --heat--;

Line 43,     change "bead" to --head--;

Column 3

Line 41,     change "-31" to --51--;

Line 54,     change "bas been" to --has been--;

Line 60,     change "print bead" to --print head--;

Line 66,     change "beat-emitting" to --heat emitting--, and change "beat" (second occurance) to --heat-- ;

Column 4

Lline 20,     change "c" to --C--;

UNITED STATES PATENT AND TRADEMARK OFFICE
CERTIFICATE OF CORRECTION

PATENT NO. : 5,319,474
DATED : 7 June 1994
INVENTOR(S) : Chun-Keun Yu

It is certified that error appears in the above-indentified patent and that said Letters Patent is hereby corrected as shown below:

Line 51,    change "FIG.L" to --FIG. 1--;

Column 5

Line 63,    "500 %" to --50%--;

Column 8

Line 6,    change "GI" to --G1--:

Column 12

Line 55,    insert --an-- before "arbitrary";

UNITED STATES PATENT AND TRADEMARK OFFICE
CERTIFICATE OF CORRECTION

PATENT NO. : 5,319,474
DATED : 7 June 1994
INVENTOR(S) : Chun-Keun Yu

It is certified that error appears in the above-indentified patent and that said Letters Patent is hereby corrected as shown below:

Column 14

Line 56,    change "mixing" to --mixed--;

Column 15

Line 14,    insert --means-- before "comprises";

Column 16

Line 33,    insert --and-- after ";".

Signed and Sealed this

Thirteenth Day of September, 1994

Attest:

BRUCE LEHMAN

Attesting Officer    Commissioner of Patents and Trademarks